United States Patent [19]

Rancourt

[11] 4,102,438
[45] Jul. 25, 1978

[54] DISC BRAKE ASSEMBLY

[75] Inventor: Yvon Rancourt, Quebec, Canada

[73] Assignee: The Dolphin Brake Corp., Sunrise, Fla.

[21] Appl. No.: 733,340

[22] Filed: Oct. 18, 1976

[51] Int. Cl.² .......................................... F16D 55/40
[52] U.S. Cl. ................... 188/18 A; 188/71.5; 188/71.6; 188/218 XL
[58] Field of Search ................... 188/18 A, 71.4–71.8, 188/72.5, 218 XL, 264 AA

[56] References Cited

U.S. PATENT DOCUMENTS

| | | | |
|---|---|---|---|
| 2,655,236 | 10/1953 | Bachman | 188/71.6 X |
| 2,826,274 | 3/1958 | Albright | 188/71.5 X |
| 2,955,678 | 10/1960 | Schjolin et al. | 188/71.6 X |
| 2,992,705 | 7/1961 | Chisnell et al. | 188/71.5 |

*Primary Examiner*—Duane A. Reger

*Attorney, Agent, or Firm*—Fleit & Jacobson

[57] ABSTRACT

Disclosed is a disc brake assembly for vehicles such as trucks, tractor-trailers, and the like. A disc, coupled to a vehicle wheel (or wheel-pair), is rotatably mounted in a housing fixed with respect to the vehicle. The disc has two planar braking faces, is permitted a limited degree of axial translation, and associates with an axially movable annular brake shoe array on each face thereof. The braking operation of each shoe array is pneumatically controlled through the means of an annular expansible or flexible bladder, with the disc-shoe initial clearance being hydraulically set by means of the same bladder. The disc is equipped with a plurality of spaced substantially radial channels, shaped and positioned so as to draw ambient cooling air through the central region of the disc, and to enhance the dissipation of heat. The brake shoe arrays are simultaneously controlled from the same side of the fixed housing.

36 Claims, 13 Drawing Figures

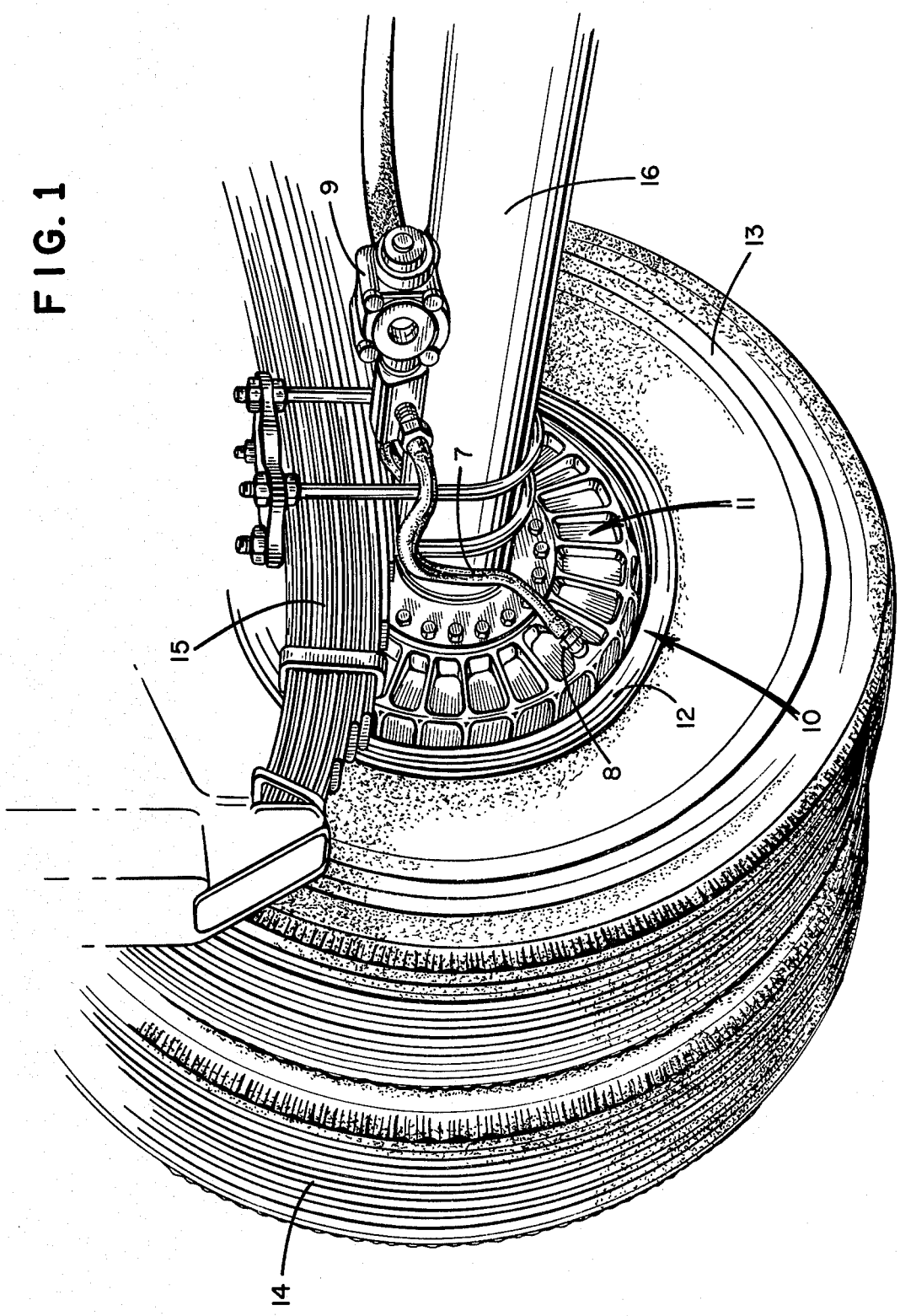

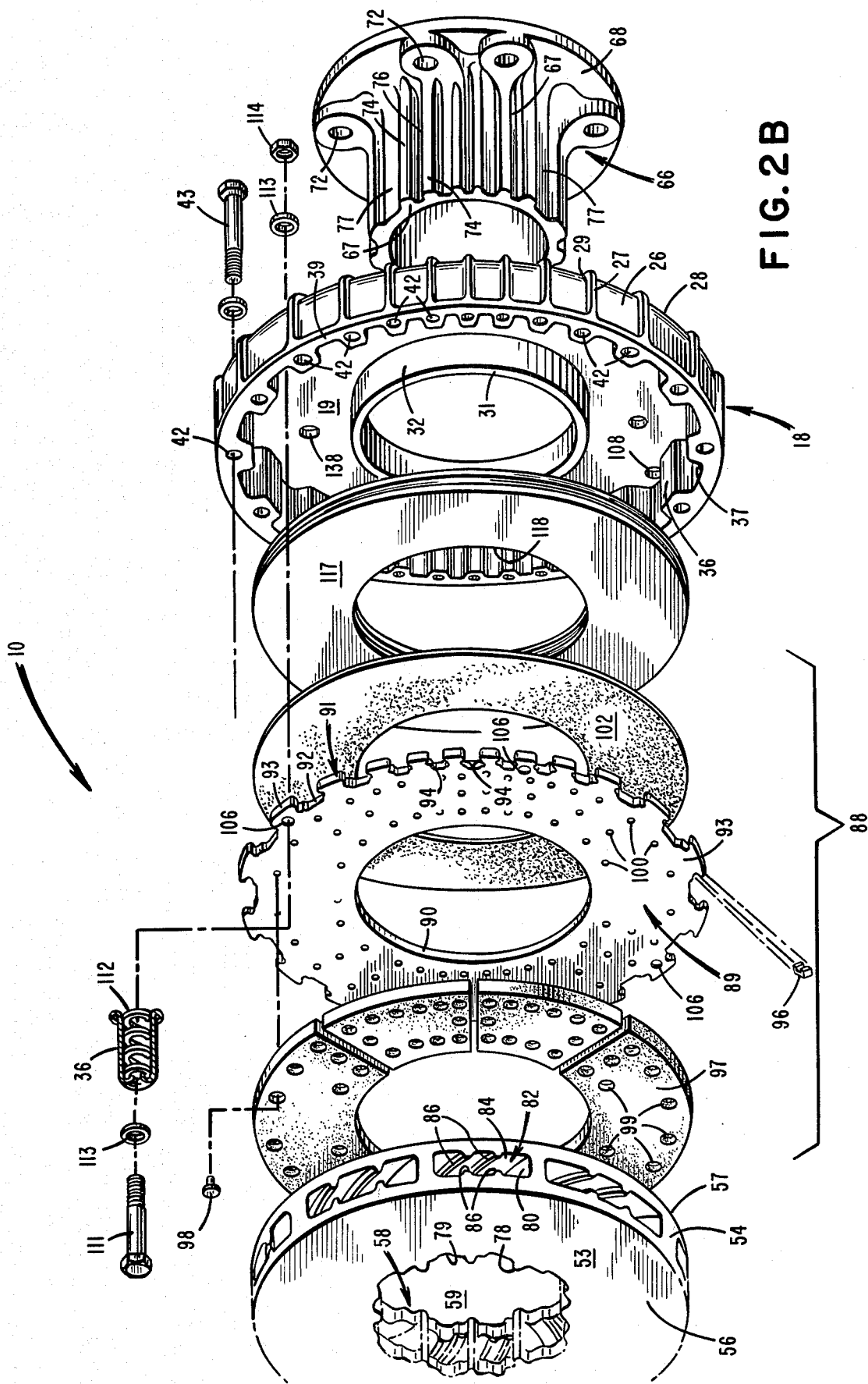

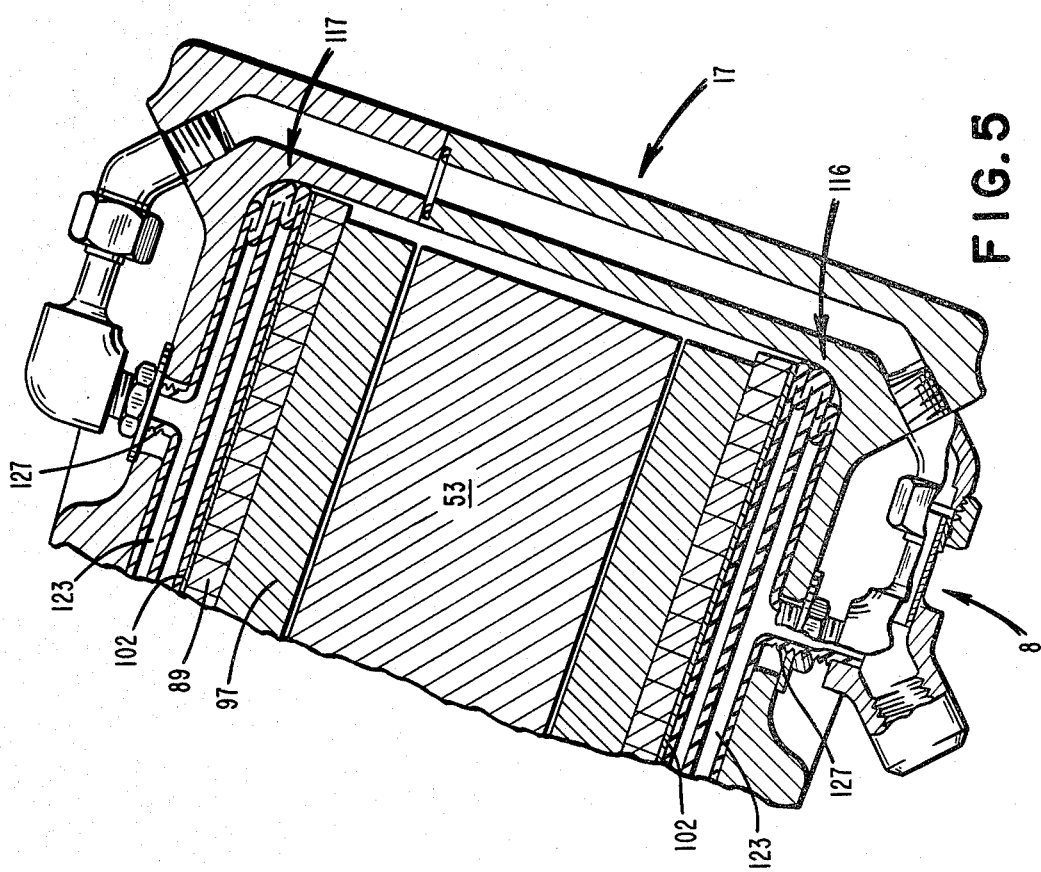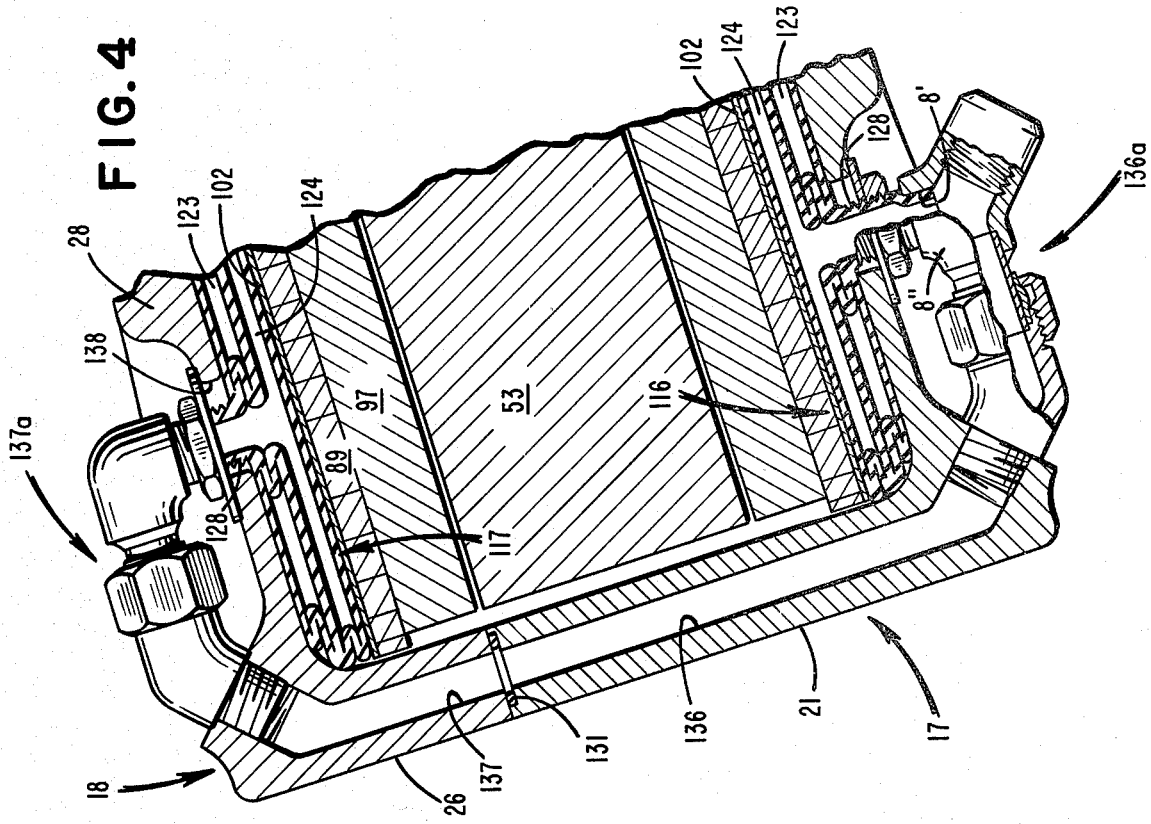

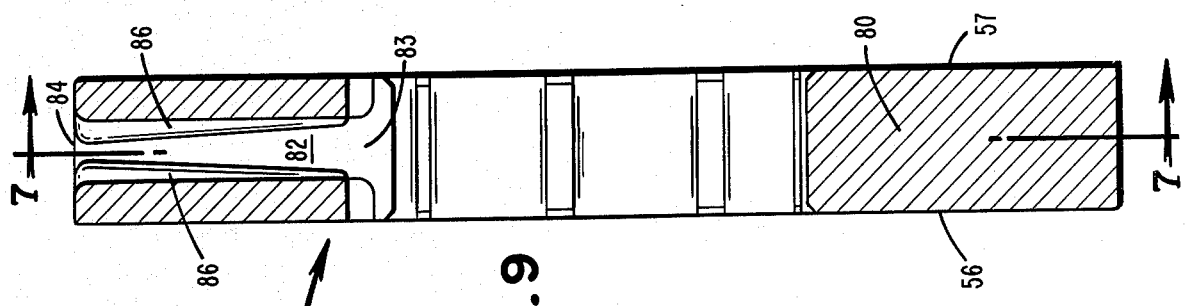
FIG. 9
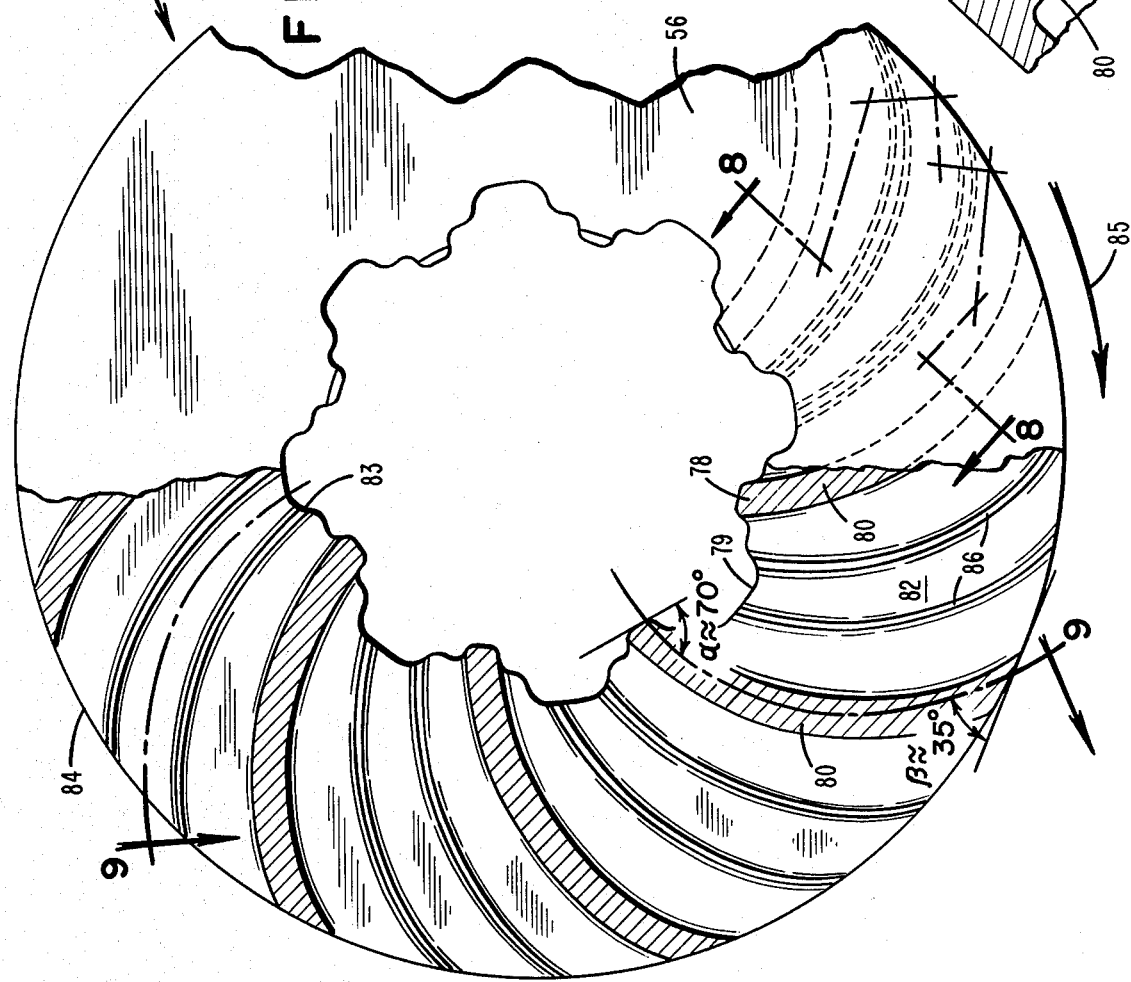
FIG. 7
FIG. 8

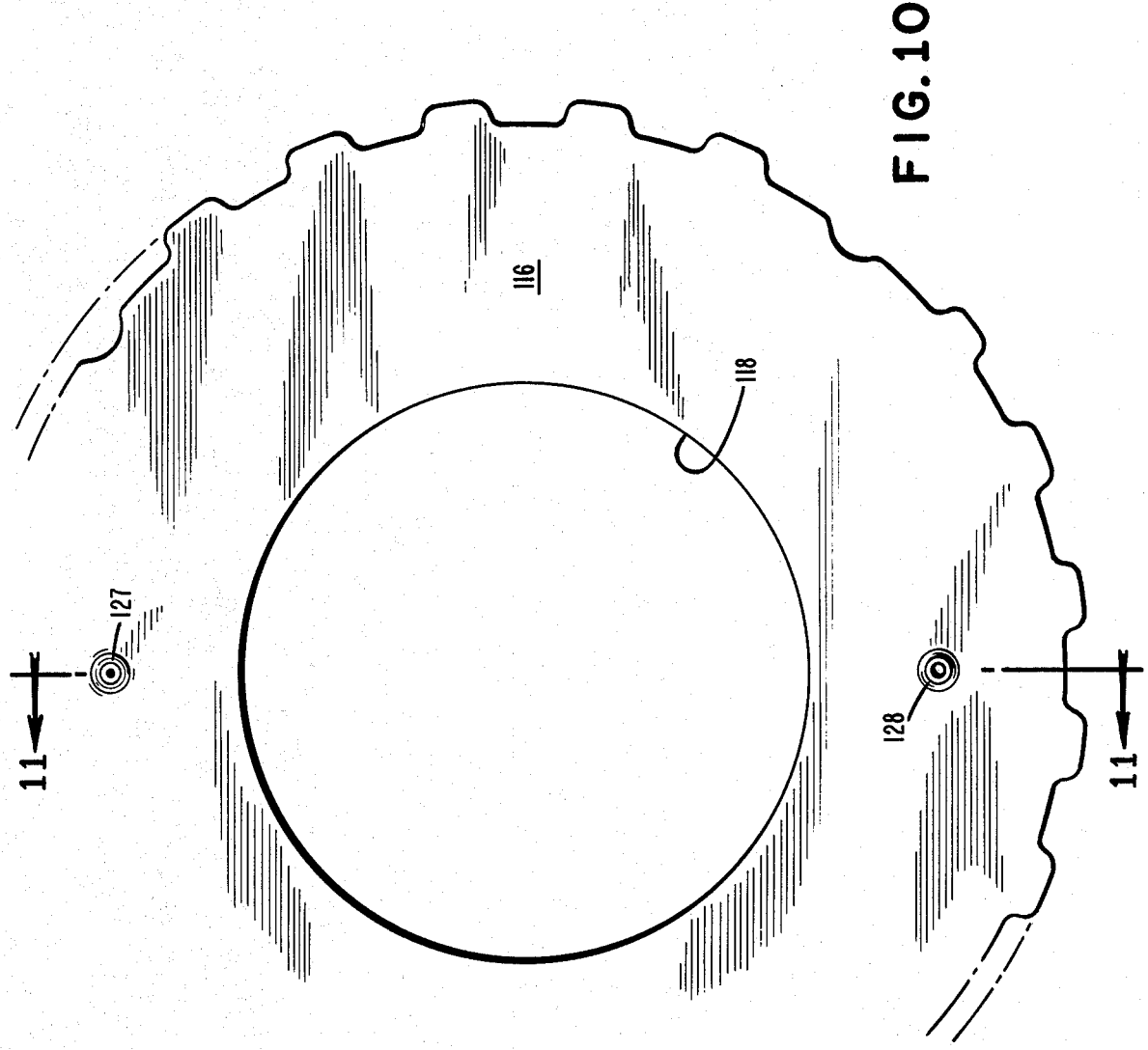

DISC BRAKE ASSEMBLY

BACKGROUND OF THE INVENTION

There are presently two basic types of commerically available vehicle brake systems. The drum brake is one, and the disc brake the other. Although the disc brake is superior to the drum brake in many respects, the disc brake does not enjoy its expected success for the larger road vehicles such as trucks, tractor-trailers, and the like. For these types of vehicles, there is much room for improvement of commercially available disc brake systems.

In available disc brake systems, the brake pads, or shoes, are quite limited in their contact area. This is of course a significant drawback when one considers the substantial inertial forces which need to be overcome when braking a large road vehicle such as a tractor-trailer. Accordingly, the drum brake is most commonly found in the larger road vehicles.

Attempts have been made, at least in the patent art, to develop disc brake systems having large contact-area brake shoes. Complex brake shoe actuating mechanisms have been proposed in an attempt to develop uniform braking forces over the entire contact surfaces of the shoes. And the problems involved in eliminating the substantial heat developed in this type of braking disc have been recognized. See U.S. Pat. No. 2,535,763 issued to Tucker, U.S. Pat. No. 3,830,345 of Boyles, and the Baxendale U.S. Pat. No. 3,896,907.

In the Tucker patent, there is disclosed a disc brake assembly wherein a unitary brake shoe is controlled by hydraulic fluid flowing into and out of a rubber-like channel member. The disc is segmented, to enable a degree of yield intended to improve contact with the brake shoe. The dissipation of heat is attempted by radial holes extending through the braking disc.

The Boyles braking system is pneumatically or hydraulically actuated, through the means of two expanding tubes intended to control the movement of braking discs positioned on respective sides of a double-faced brake lining structure. The discs are actuated through annular pistons, with fluid being fed to the respective tubes from opposite sides of the assembly. Boyles dissipates heat by specific spacings of elements and the provision of cooling ribs.

In the Baxendale patent, brake actuation is through the means of four hydraulic pistons fed from the same side of the assembly to actuate two annular brake shoes. Cooling is designed to take place by cooling slots which extend into the disc.

As far as is known to the applicant, none of the three disc brake assemblies described above has found its way into the commercial marketplace. This is perhaps because of ineffectual disc cooling, even in the case of the Tucker system with its relatively limited contact areas. Or perhaps absence from the marketplace is due to the complexity of the brake actuating mechanisms, or the inability of the mechanisms to maintain uniform braking forces over the entire disc surfaces. And coupled with the degree of complexity, are factors such as elevated initial cost, difficulty of manufacture, and increased maintenance and repair considerations.

There are no commercially available disc brake systems known to the applicant which utilize large contact-area annular brake shoes, which accomplish efficient cooling, and which nonetheless enjoy simplicity and low cost of construction, maintenance and repair. It is toward the elimination of this deficiency that the present invention is directed.

SUMMARY OF THE INVENTION

The present invention relates to a disc brake system designed especially for large vehicles such as trucks, tractor-trailers, and the like, but which could find use on other vehicles such as automobiles, aircraft, etc. The disc brake system is relatively uncomplicated in a mechanical sense, and is therefore quite versatile and economically practical.

More specifically, the present invention relates to a disc brake system wherein a braking disc is effectively cooled, notwithstanding substantial inertial forces to be overcome during braking, and despite the use of large surface-area annular brake shoes. The invention also relates to a mechanism which simply and yet effectively drives a pair of brake shoe arrays into contact with opposite faces of a rotating disc so as to brake one or more vehicle wheels integral with the disc. Improved mechanisms for maintaining proper initial disc-shoe clearance, for braking a vehicle evenly and with short response times, for braking with uniform wear and prolonged life of the brake shoe arrays, and for effectively delivering fluid to all pneumatic and hydraulic systems, are also contemplated by the present invention.

It is therefore a principal object of this invention to provide a commercially practical, disc-type braking system which utilizes a large surface-area disc and a pair of oppositely facing brake shoe arrays to effect braking of varied types of vehicles.

Another object of this invention is to provide a disc brake assembly which is effective and yet relatively uncomplicated, and which therefore enjoys the advantages of facilitated manufacture and assembly, maintenance and repair.

Still a further object of this invention is to provide a disc brake assembly which rapidly dissipates the heat generated during braking.

A more specific object of this invention is to provide a disc brake assembly in which cooling is accomplished by the forced circulation of ambient air though the braking disc.

A further object of this invention is to provide a disc brake assembly in which there is a rapid, highly efficient and evenly distributed application of braking forces.

Still another object of this invention is to provide a disc brake assembly which effects braking action through a flexible or an expansible bladder.

Another object of this invention is to provide a bladder-actuated disc brake assembly operated pneumatically and/or hydraulically.

A still further object of this invention is to provide a disc brake assembly utilizing a double-chamber bladder wherein braking operations are pneumatically controlled, wherein initial disc-shoe clearance is hydraulically set, and wherein emergency braking can be hydraulically accomplished even upon the failure of an air chamber or the rupture of an air conduit.

Yet another object of this invention is to provide a commercially feasible disc brake assembly utilizing a double-faced rotating disc and a pair of large-area annular brake shoe arrays for contacting the respective surfaces of the disc.

A further object of the present invention is to provide a commercially feasible disc brake assembly which effectively utilizes a large contact area braking disc and at least one similarly dimensioned brake shoe.

Still another object of the present invention is to provide component parts, such as a braking disc, an annular bladder, a brake shoe array and a wheel adaptor, for use with a novel disc brake assembly.

The invention relates to a disc brake assembly designed for use with relatively heavy vehicles such as trucks, tractor-trailers, and the like, but equally useful an automobiles, light commercial vehicles and aircraft, and which effectively accomplishes the objects set forth above, as well as numerous other and related objects.

A generally cylindrical brake housing is secured to the vehicle at each desired braking location, coaxial with the associated axle and axle casing. The housing has central air inlets in the region of the axle casing, and air outlets around the circumferential surface thereof. An annular braking disc is centrally disposed in the housing, and communicates with an associated vehicle wheel for rotation therewith. Two annular brake shoe arrays are mounted in the housing on opposite sides of the braking disc, and are designed for axial movement toward and away from respective surfaces of the disc. The disc is preferalby mounted for a limited degree of axial movement, to ensure that the brake shoe arrays exert balanced braking forces on the respective sides of the disc.

Movement of each brake shoe array is controlled by fluid pressure acting through a chamber of an expansible or flexible bladder. Actuation may be pneumatic, hydraulic, or a combination of the two, wherein expansion or flexion of the bladder causes each brake shoe array to move towards its surface of the disc for braking engagement therewith. In one specific embodiment of the invention, each bladder has two fluid chambers. The first bladder chamber is pneumatically actuated and is used to control the braking action of the shoe array. The second chamber of the bladder is hydraulically actuated and is used to set the initial disc-shoe clearance. The clearance may be set manually, or may be automatic, and is determined by the condition of the second bladder chamber due to the infusion of hydraulic fluid. With such a bladder assembly, the rapid reaction time of a pneumatic braking system can be enjoyed, yet without losing the flexibility of wide limits of adjustability. In addition, with this specific embodiment of the bladder, emergency braking can still be hydraulically accomplished, even if an air chamber fails or an air line ruptures.

Each braking disc includes a plurality of circumferentially spaced, generally radial channels for communicating with the air inlets and the air outlets of the housing. In this manner, ambient cooling air is drawn into the central air inlets of the housing, passes through the radial channels in the disc, and leaves the housing through the circumferential air outlets. The disc channels are arcuate in one embodiment, curve away from the principal rotational sense of the disc, and may include internal turbulence-inducing and radiating vanes; the air inlets and outlets of the housing are strategically positioned; and optional air deflectors may be employed to direct air into the inlets of the housing. In another embodiment, the disc channels are S-shaped, slightly angled relative to radii at the central inlets, and substantially coincident with radii at the circumferential outlets. Accordingly, the dissipation of heat during a braking operation is maximized by the inventive disc brake assembly.

These features of the present invention, as well as numerous possible alterations and modifications, will become more apparent when reference is made to the following description of a preferred embodiment, taken in conjunction with the accompanying drawings.

BRIEF DESCRIPTION OF THE DRAWINGS

FIG. 1 is a perspective view of the inventive disc brake assembly, as seen from the underside of a vehicle;

FIGS. 2A and 2B are exploded perspective views of the inventive disc brake assembly;

FIG. 4 is a cross section of the disc brake assembly taken substantially along line 4—4 of FIG. 3;

FIG. 5 is a cross section of the disc brake assembly taken substantially along line 5—5 of FIG. 3;

FIG. 7 is a partial cross section of the braking disc taken substantially along line 7—7 of FIG. 9;

FIG. 8 is a cross section of a portion of the braking disc taken substantially along complex line 8—8 of FIG. 7;

FIG. 9 is a cross section of the braking disc taken substantially along line 9—9 of FIG. 7;

FIG. 10 is a plan view of the two-chamber bladder;

FIG. 11 is a cross section of the bladder taken substantially along line 11—11 of FIG. 10.

DETAILED DESCRIPTION OF THE DRAWINGS

Figure 2A:
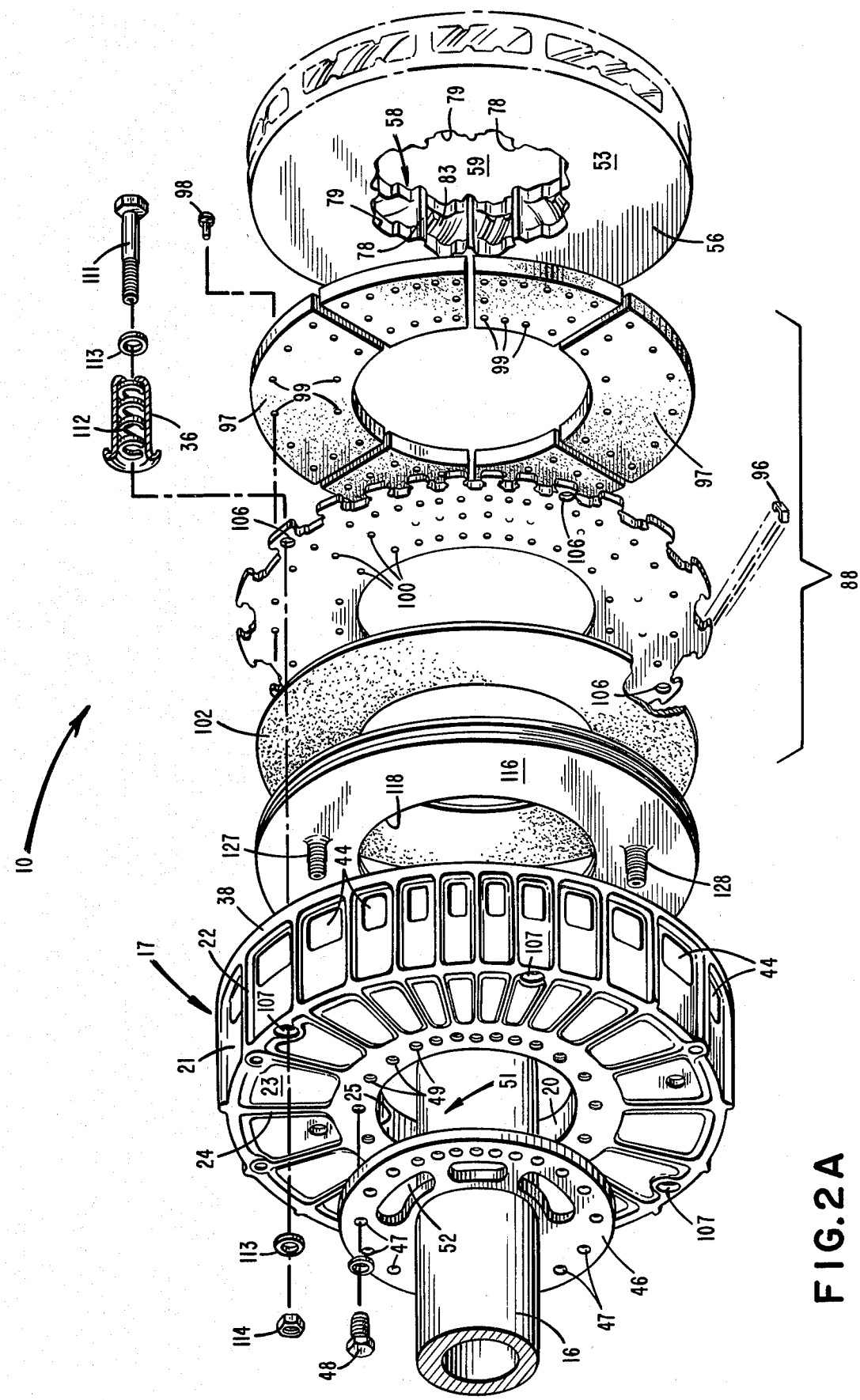

Referring now to the drawings, and to FIG. 1 in particular, the inventive disc brake assembly can be seen generally at 10. A housing, designated generally at 11, is rigidly mounted on an axle casing 16 of a vehicle such as an automobile, truck, tractor-trailer, or the like. The axle casing is concentric with and houses a rotating axle (not shown) integral with the vehicle wheel. In FIG. 1, the disc brake assembly 10 is mounted on a trailer, and is adapted to brake a double-wheel assembly shown at 12. The wheel 12 may be of the type which supports a single tire, but is shown to be provided with a pair of tires 13 and 14. A leaf spring array is illustrated at 15.

Figure 6:
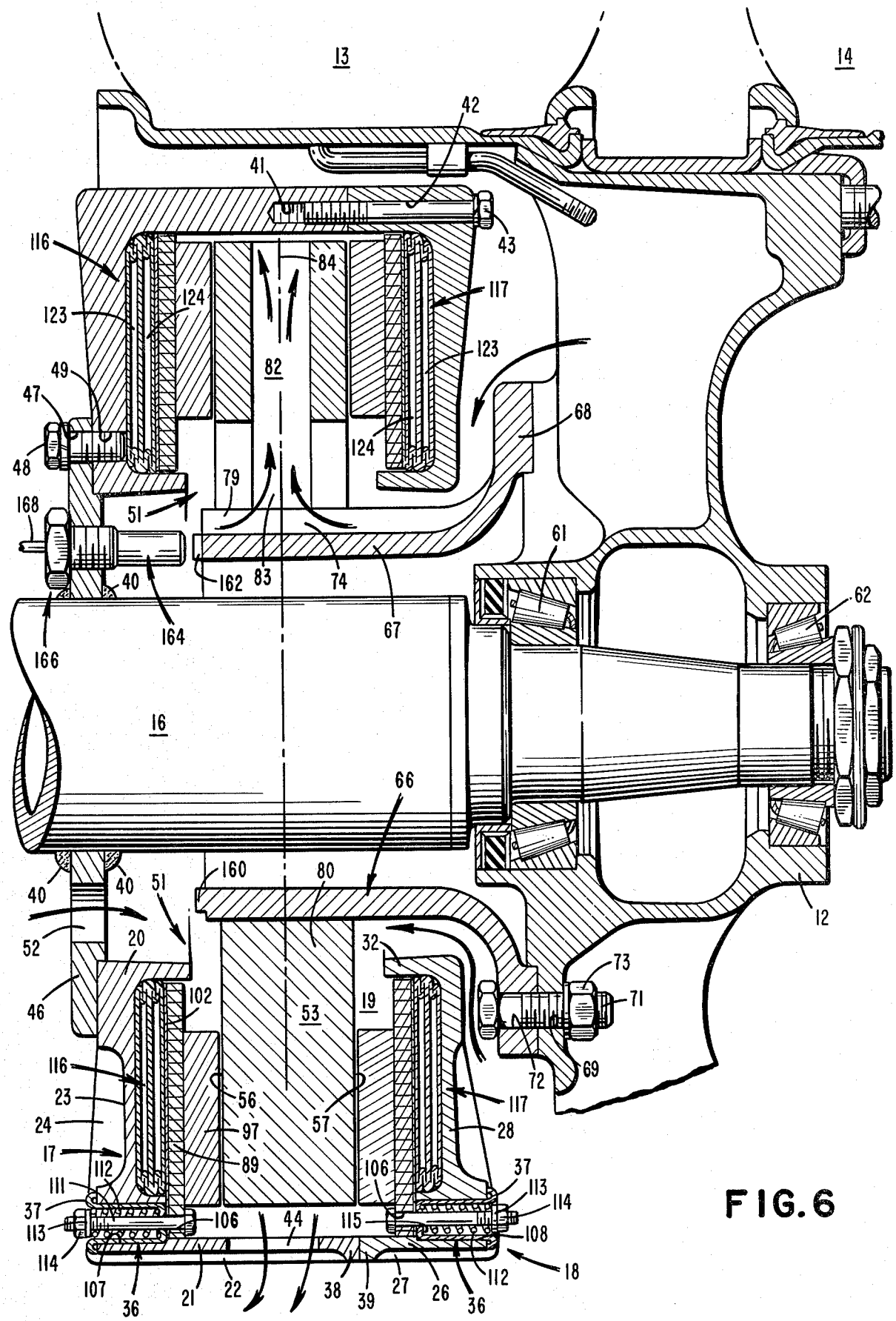
FIG. 6 is a cross section of the disc brake assembly taken substantially along line 6—6 of FIG. 3.

The housing 11, as seen best in FIGS. 2 and 6, is defined by a pair of complementary generally cup-shaped housing members. In particular, housing 11 comprises an inner housing member 17, and an outer housing member 18. Housing members 17 and 18 are coupled together to define a housing interior indicated at 19.

Each of the respective housing members 17 and 18 is illustrated as being of one-piece construction, although this is not essential. Inner housing member 17 includes a circumferential wall 21, preferably provided with reinforcing ribs 22, a side wall 23 preferably including spaced reinforcing ribs 24, and a central opening 25 defined by an inwardly-facing flange 20. The outer housing member 18 is similarly constructed, and includes a circumferential wall 26 with spaced ribs 27, a side wall 28 with ribs 29, and a central opening 31 defined by an inwardly-facing flange 32.

As seen best in FIG. 2, the inside circumferential surface of the outer housing member 18 is provided with a plurality of inwardly directed, spaced apart protrusions 36 defining intermediate slots 37. Although not illustrated, the circumferential surface of inner housing member 17 is similarly formed with a plurality of inwardly directed protrusions defining intermediate slots. The respective housing members 17 and 18 have flanges 38 and 39 adapted for mating engagement when the housing members are in the assembled position. As so assembled, the interior protrusions and slots are in axial alignment and, as will be explained in greater detail below, define guideways for axially movable brake shoe assemblies.

The inner housing member 17 is provided with a plurality of circumferentially spaced, tapped bores 31 (see FIG. 6) which extend into the interior of flange 38 and into the circumferential wall 21. A plurality of similarly spaced holes 42 (see FIGS. 2 and 6) extend entirely through the flange 39 and circumferential wall 26 of the outer housing member 18. As shown best in FIGS. 2 and 6, the respective inner and outer housing members 17 and 18 are secured together by means of bolts 43 which extend through the holes 42 in the outer housing member 18 and thread into the tapped bores 41 in the inner housing member 17. As will be explained hereinafter, the housing 11 is provided with air outlets around the circumference thereof. In the illustrated embodiment, the air outlets take the form of a plurality of circumferentially spaced openings 44 carved through the wall 21 of inner housing member 17. And for reasons which will also be explained below, the openings 44 are positioned more toward the side wall 23 of the inner housing member 17 than toward side wall 28 of the outer housing member 18.

In FIGS. 2 and 6, the housing 11 is shown to be secured to the vehicle by means of a support plate 46 welded, as at 40, to the tubular axle casing 16. Support plate 46 is provided with a plurality of circumferentially spaced holes 47 for accommodating the shanks of bolts 48 which engage corresponding tapped bores 49 in the side wall 23 of inner housing member 17.

The respective flanges 20 and 32 of inner and outer housing members 17 and 18 are sized so that an annular clearance gap 51 (see FIGS. 2 and 6) is defined between the inner periphery of housing 11 and the exterior of the tubular axle casing 16. For reasons which will be explained in greater detail hereinafter, the clearance gap 51 defines the air inlet to casing 11. And to permit the entry of ambient air into housing 11, three (for example) openings 52 are provided in the support plate 46, generally in alignment with the clearance gap 51.

A principal element of the inventive disc brake assembly is a braking disc 53. Disc 53 has an outer circumferential wall 54, a pair of planar braking surfaces 56 and 57, and an inner peripheral wall 58 defining a central opening 59. The vehicle wheel 12 is mounted for rotation relative to axle casing 16, as best shown in FIG. 6, by means of bearings 61 and 62.

Braking disc 53 is adapted to rotate the wheel 12. More specifically, the disc 53 is made to rotate with wheel 12 through the means of an adaptor sleeve 66. Sleeve 66, as best seen in FIGS. 2 and 6, includes a tubular neck portion 67 and a radially extending flange portion 68 provided with a plurality of circumferentially spaced bores 72. The wheel 12 is secured to the adaptor sleeve 66 by means of hexagonal-head bolts 71 (FIG. 6) which extend through the bores 72 in the adaptor sleeve 66, and corresponding holes 69 in the wheel 12. After the threaded shanks of bolts 71 pass through openings 69 in the wheel 12, they are engaged by securing nuts 73. The outside surface of the tubular neck portion 67 is provided with a plurality of circumferentially spaced, longitudinally extending splines 74 which alternately define relatively narrow grooves 76 and relatively wide grooves 77, all as shown best in FIG. 2.

Figure 3:
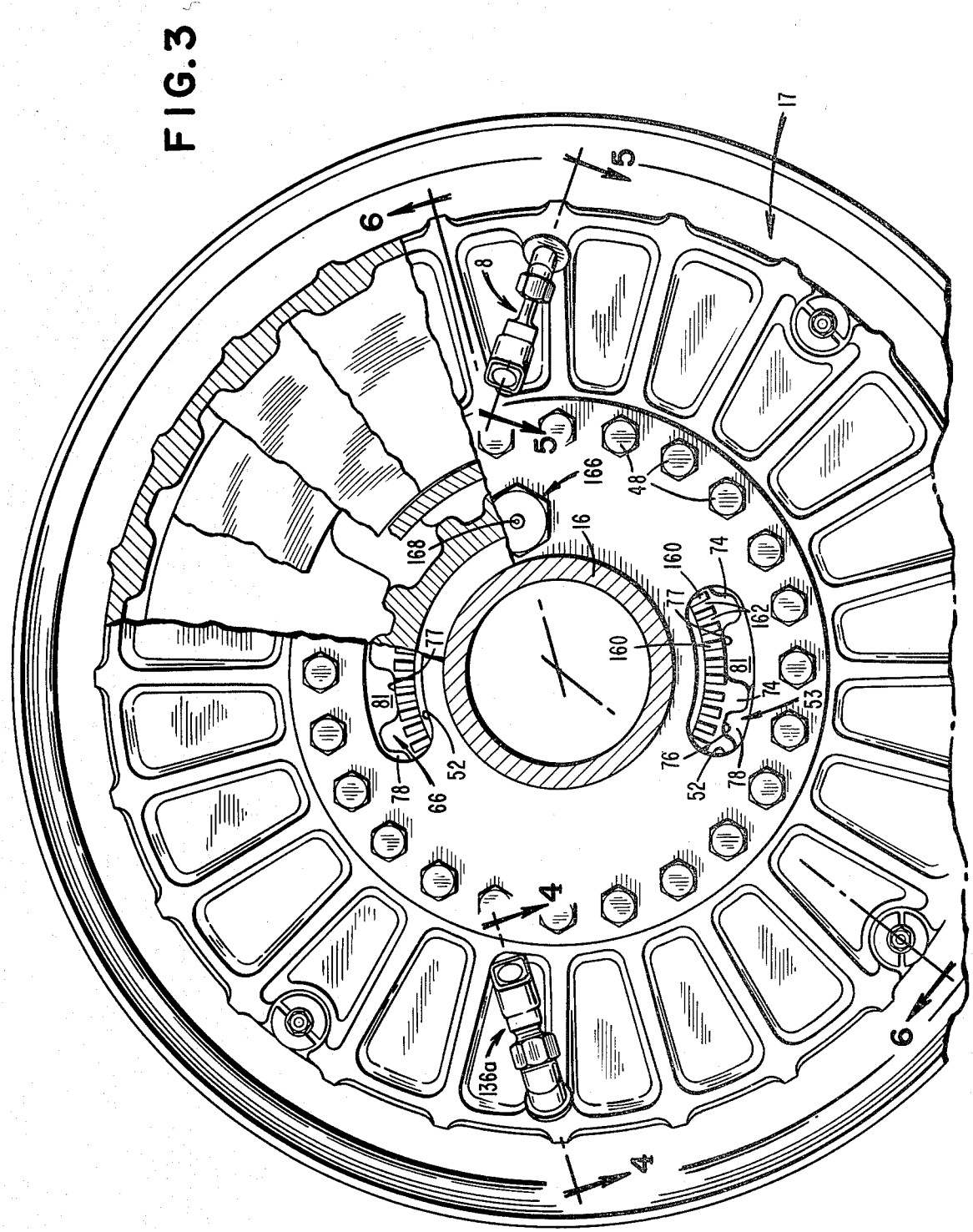
FIG. 3 is an end view of the assembled disc brake, with the tires removed and the assembly partially broken away, as viewed from the underside of the vehicle.

The inner peripheral wall 58 of the disc 53 defines a plurality of circumferentially spaced ribs 78 and intermediate recesses 79. The disc 53 is designed to engage the adaptor sleeve 66 (and therefore the wheel 12) by the association of the disc ribs 78 with the relatively narrow adaptor grooves 76. The relatively wide adaptor grooves 77, on the other hand, align with the disc recesses 79, and define a plurality of air passageways designated at 81 in FIG. 3. The association between the disc 53 and the sleeve 66 ensures that the disc 53 rotates with the wheel 12. On the other hand, and for reasons which are explained below, the disc 53 is allowed a limited degree of axial translation relative to adaptor sleeve 66.

As shown best in FIGS. 2 and 6 through 9, a plurality of arcuate partition walls 80 extend between the respective braking surfaces 56 and 57 of disc 53. These partition walls 80 define a plurality of circumferentially spaced radial channels 82 having inner ends 83 and outer ends 84, opening, respectively, through the inner and outer peripheral walls 58 and 54 of the disc 53. The arcuate channels 82, as shown best in FIG. 7, are divergent in the outward direction and curve away from the principal rotational sense of the disc 53. The principal rotational sense (when the vehicle is moving forward) is indicated by the arrow 85 in FIG. 7.

As illustrated in the specific example of the disc 53, two inwardly directed substantially radial vanes 86 extend between each pair of adjacent partition walls 80. The vanes 86 are arcuate, so as to correspond with the arcuate shape of the channels themselves, and as shown best in FIG. 9, have height dimensions which increase in the direction of outer channel ends 84. It should also be noted that the outer ends 84 of the channels 82 are spaced from the openings 44 in the inner housing member 17 when the disc brake system is in its assembled condition. This ensures adequate air circulation.

The rotating disc 53 associates with a pair of brake shoe arrays indicated at 88. One such brake shoe array 88 is disposed within the housing 11 on each side of the disc 53. The arrays 88 are axially movable toward and away from the adjacent braking surfaces 56 and 57 of the disc 53, and are adapted to frictionally engage the disc to effect braking action.

More specifically, on each side of the disc 53 is disposed an annular backing plate 89 to metal or the like, having a central opening 90 for accommodating the axle casing 16, and an outer circumferential surface 91 provided with a plurality of spaced recesses 92 which define intermediate guide lugs 93. Each guide lug 93 is provided with a recess 94 on each side thereof; recesses 94 serve to receive friction-reducing inserts 96 of nylon or the like. It will be noted that the elements of the respective brake shoe arrays 88 are mirror images. Therefore, the description of one element will suffice for a clear understanding of both.

The guide lugs 93 of each backing plate 89 are arranged to be received in the grooves 34 and 37 of the respective housing members 17 and 18. The housing member protrusions 33 and 36 are correspondingly adapted to be engaged by grooves 92 of each backing plate. The nylon inserts 96 are designed to bear against the sides of the protrusions 33 and 36 for reducing friction during axial movement of the brake shoe arrays 88, and thereby decrease wear.

Each of the backing plates 89 is provided with a plurality of brake lining segments 97 of suitable brake lining material. Together, the lining segments define a large-area annular contact surface for each brake shoe array 88. Lining segments 97 are secured to the surfaces of the respective backing plates 89 by suitable bonding or by means of rivets 98 which extend through openings 99 in the lining segments themselves, and openings 100 in the backing plates 89. The surface of each backing plate 89 remote from lining segments 97, is equipped with an asbestos insulating sheet 102. Sheets 102 are annular, and are attached to the backing plates 89 by at any suitable manner such as bonding or riveting, so that the brake shoe array 88 forms a three-ply structure. It is contemplated that a rigid sheet of an insulating material be used in place of the backing plate 89 and associated insulating sheet 102.

The inventive disc brake assembly 10 is provided with return mechanisms for urging the respective brake shoe arrays 88 away from and out of engagement with the associated braking surfaces 56 and 57 of disc 53. More specifically, and with particular reference to FIGS. 2 and 6, it will be noted that each backing plate 89 is provided with a plurality of peripherally spaced openings 106 (four being shown). Corresponding openings 107 and 108 are provided in the respective side walls 23 and 28 of the housing members 17 and 18. The openings 106 in the backing plates 89 are adapted to accommodate the shanks of threaded bolts 111, and are sized so that the backing plates serve as abutment surfaces for the respective heads of bolts 111. Openings 107 and 108 in the respective housing members are larger. In this regard, and as seen best in FIG. 6, openings 107 and 108 are sized to accommodate spring retainer cups 36.

Each of the cups 36 is housed in an opening 107 or 108, with the exterior surface thereof being flared at 37 so as to abut against the adjacent surface of housing member 17 or 18. The cups 36 serve to support and guide an equal number of return springs 112. The springs 112 are retained on the shanks of bolts 111 by means of retaining washers 113 and nuts 114 on the exterior of the inner and outer housing members 17 and 18. Springs 112 are retained at the other ends by inwardly-turned flanges 115 which abut against the backing plates 89. Thus, the return springs 112 urge the respective backing plates 89 and hence the entire brake shoe arrays 88 out of engagement with the respective surfaces of the braking disc 53. Yet when the brake shoe arrays 88 are actuated, the arrays are free to move into engagement with the surfaces of the disc 53. In this regard, it should be noted that the cups 36 are designed to accommodate the nuts 114.

As noted previously, the inventive disc brake assembly 10 is operated by fluid pressure. In a particular embodiment, the inventive system operates by a combination of pneumatic and hydraulic actuation. FIGS. 2, 6, 10 and 11 illustrate bladders 116 and 117 which serve to control the operation of the brake shoe arrays 88. The bladders shown in detail in FIG. 6 are of the expansible type, constructed of rubber or the like. The bladder detailed in FIG. 11, on the other hand, is constructed of a flexible material, and can even be of a metal such as stainless steel. While the bladder construction is necessarily different, the operation of the expansible and flexible bladders is the same.

Bladders 116 and 117 are housed between respective insulating plates 102 and an interior surface of the associated housing member 17 or 18. As can be seen, bladder 116 is associated with the inner housing member 17 and bladder 117 with the outer housing member 18. FIG. 10 illustrates that the outer circumferential surface of the bladders can be made conformal with the housing interior surfaces.

The bladders 116 and 117 are formed of any suitable heat-resistant elastomeric or flexible material, such as rubber or steel, respectively. Each bladder is of annular configuration and has a central opening 118 for accommodating the axle casing 16. The bladders are biased by the action of return springs 112 acting through the brake shoe arrays 88, and are normally urged toward their collapsed positions. When braking is to be effected, the bladders are expanded or flexed by the application of fluid.

As shown best in FIGS. 10 and 11, each bladder (bladder 116 being illustrated) has an interior divided into two distinct chambers 123 and 124 by means of a central partition 126. Each of the chambers 124 and 123 is adapted to be connected to an associated source of fluid by means of respective circumferentially spaced nipples 127 and 128. As illustrated, the nipples 127 and 128 face away from the braking disc 53 when the bladders are in their operative positions.

In the preferred embodiment, two separate sources and types of actuating fluid are utilized in the brake assembly 10. One fluid is compressed air, and the other is an hydraulic fluid. The bladder chamber nearest the disc, chamber 124, is adapted to receive air through its nipple 128. Hydraulic fluid is fed to chamber 123 through nipple 127.

The hydraulic fluid fed to chambers 123 expands or flexes the bladders 116 and 117, and hence urges the respective brake shoe arrays 88 toward the bearing surfaces of disc 53, overcoming the bias exerted by return springs 112. It is contemplated that a predetermined volume of hydraulic fluid be fed to the respective bladders, so as to define the desired initial clearances between the braking disc and the brake shoe arrays, and then the source of fluid be closed off. Then, the infusion of compressed air into chambers 124 actuates the brakes by forcing the brake shoe arrays into full contact with the respective braking surfaces of the disc. It should be noted that the operation of the hydraulic clearance adjustors can be manual or automatic.

Three points should be noted before describing a specific manner of feeding fluid to the bladder chambers. First, it is contemplated that the inventive braking system could be operatted by compressed air alone, or by hydraulic fluid alone. Next, while air is disclosed as being fed to the chamber nearest the disc and hydraulic fluid to the other chamber, the compressed air and hydraulic fluid could be fed to the opposite chambers. And thirdly, it should be appreciated that the two-chamber bladder design is well suited for back-up safety braking. In this latter regard, an automatic or manual means could be employed to ensure that braking fluid is fed to the hydraulic chamber of a bladder should the air chamber or the air line rupture.

The delivery of compressed air or hydraulic fluid from a source, such as that represented by the number 9 in FIG. 1, to the inner bladder 116, is relatively straightforward. A conduit 7 from the hydraulic fluid source 9, for example, merely need be connected to the nipple 127 of bladder 116 through an appropriate fitting 8 (also see FIGS. 3 and 5). The delivery of compressed air to chamber 124 of the innermost bladder 116 through nipple 127 is similarly uncomplicated, as best seen in FIG. 4.

It is more difficult to control the operation of the outer bladder 117, because of the necessary complexity involved in feeding compressed air and hydraulic fluid without the exposure of conduits to the side of the assembly adjacent the rotating wheel. This is accomplished in the present invention by providing passages 136 and 137 in the circumferential walls 21 and 26 of the respective inner and outer housing members 17 and 18. FIG. 4 illustrates an air connection to chambers 124 of bladders 116 and 117. FIG. 5 illustrates a similar connection to bladders 116 and 117, but to their respective hydraulic chambers 123.

The compressed air nipple 128 of bladder 117 extends through an aperture 138 in the side wall 28 of outer housing member 18. Nipple 128 is then connected to a fitting 137a which, in turn, extends into the outer housing member 18 at one end of the internal passage 137. The opposite end of passage 137 mates with the passage 136 carved into the outer wall of inner housing member 17. The abutting extremities of passage 136 and 137 are sealed by means of a gasket shown at 131. The end of passage 136 remote from passage 137 receives the fitting 8 (shown also in FIG. 1) which is, in turn, connected to nipple 128 of bladder 16. Fitting 8 is also associated with the supply conduit. As illustrated in FIG. 4, fitting 8 is designed to feed bladder 116 directly through a tap 8', while bladder 117 is simultaneously controlled through tap 8". Hydraulic fluid is delivered to bladders 116 and 117 in a similar manner as that described immediately above, except from a source of fluid such as oil. It is contemplated that hydraulic fluid be fed at a pressure of somewhere on the order of 60–100 psi, and that air be delivered at a pressure no greater than 150 psi.

The operation of the inventive disc brake assembly 10 is as follows. As illustrated in FIG. 6, the bladders 116 and 117 are in their repose conditions, having been urged away from disc 53 by means of return springs 112. Chambers 123 contain a given amount of hydraulic fluid, so as to set the desired clearance between the disc and the shoe arrays. Chambers 124 are collapsed.

When a braking operation is to be initiated, compressed air from a source is simultaneously fed into chambers 124 of bladders 116 and 117. The bladders simultaneously expand, forcing both of the backing plates 89, with their brake linings 97, into frictional engagement with the associated braking surfaces 56 and 57 of the disc 53. It should here be recalled that the disc 53 is coupled to the adaptor 66 and hence the vehicle wheel 12, so that the disc and wheel rotate as an integral unit. However, the disc 53 is permitted a limited degree of axial movement relative to the adaptor 66. As a result, even wear of the respective brake shoe arrays 88 is ensured, as is uniform braking forces from both sides of the disc. Disc 53 can be thought of as "floating", automatically seeking a central and balanced position between the respective brake shoe arrays 88. This feature also relieves strain on the thrust bearings. A centering mechanism (not shown) can be used to initially center the disc 53 between the two brake shoe arrays 88.

As can be seen in the figures, the braking disc has a substantial surface area, and the brake linings on each side of the disc are of generally corresponding surface area. These features, coupled with the fact that the disc is frictionally engaged on both of its planar surfaces, results in an extremely effective braking arrangement. Still, there is the matter of heat dissipation.

In accordance with a novel feature of the invention, the heat generated during such a braking operation is rapidly dissipated by the forced flow of ambient cooling air. The brake system is kept cool while the vehicle is moving, and the heat generated while braking is similarly dissipated by forced air. Cooling air enters the ports 52 in mounting plate 46 (FIGS. 2 and 6), travels through the air inlet, or clearance gap 51, of inner housing member 17 (FIGS. 2 and 6), traverses the passages 81 between disc 53 and the adaptor sleeve 66 (FIG. 3), passes through the disc channels 82 (FIGS. 6 and 7), and returns to the atmosphere through the ports 44 in the circumferential wall 21 of the inner housing member 17 (FIG. 6). The flow of cooling air through the inventive brake assembly is indicated by the arrows in FIG. 6. It will be noted that the asymmetry of the ports 52 relative to the peripheral surface of the housing 11 result in air to be discharged from the housing in a direction away from the vehicle tires.

The vanes in the disc aid in the dissipation of heat by developing turbulence of the air passing through channels 82. The shape of the channels, on the other hand, induces a region of low pressure at the circumferential surface of the disc, thereby drawing cooling air into the housing at the central region of the disc. It should also be noted that cooling air can be forced into the housing from the side adjacent the wheels, by equipping the assembly with a suitably shaped impeller mechanism (not shown). As can be understood, the intimate contact between the ambient cooling air and the surfaces of the disc promote rapid and complete dissipation of the heat generated during braking operations. The increased height of the vanes at the circumferential periphery of the disc results in increased cooling at this disc region.

Figure 12:
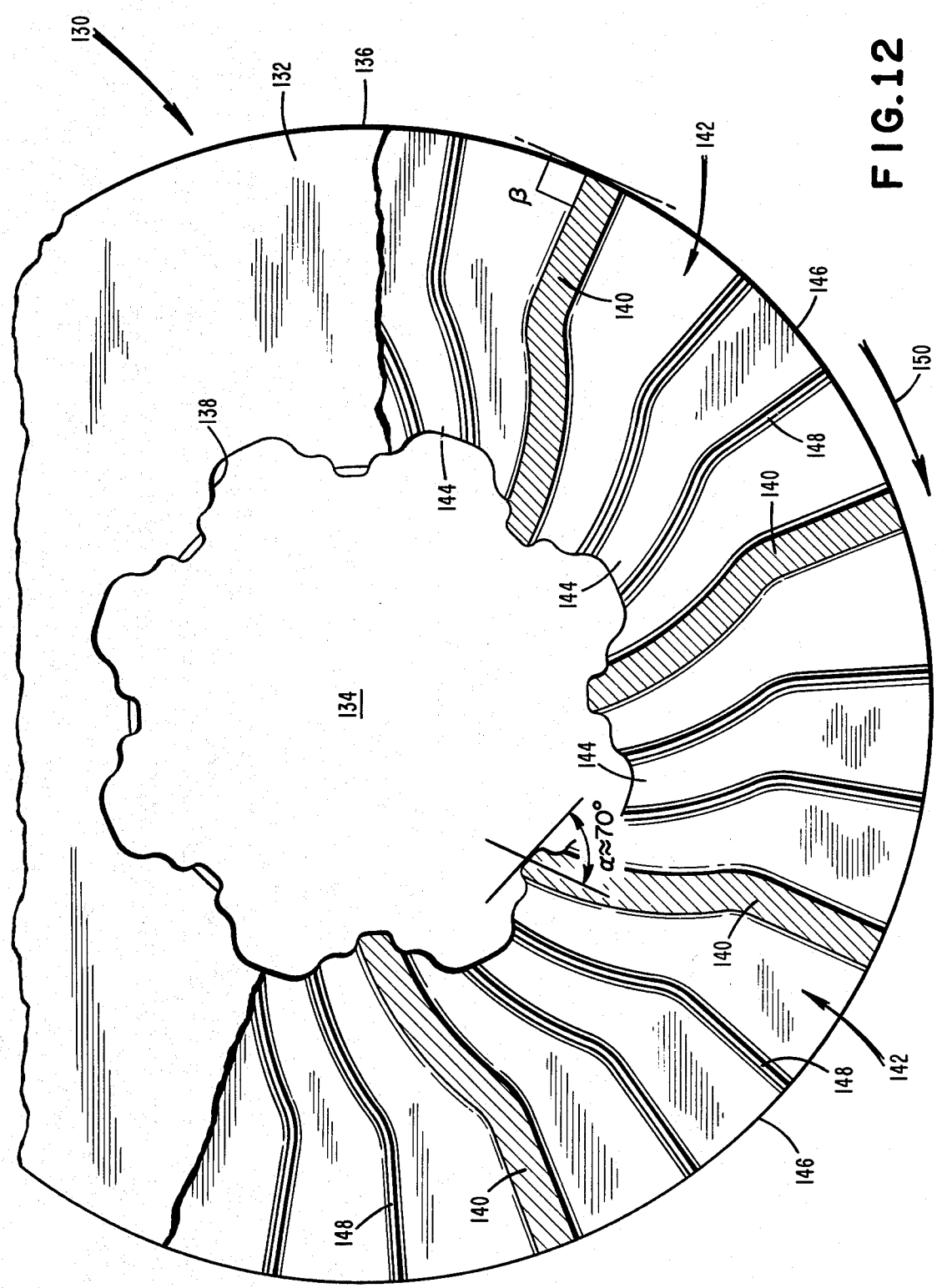
FIG. 12 is a cross section similar to FIG. 7, showing an alternate embodiment of an internally channeled braking disc.

With reference now to FIG. 12, another embodiment of the braking disc will be described. Here, the disc is shown generally at 130. The disc 130 takes the same general shape as disc 53 illustrated in FIG. 7, and includes oppositely facing braking surfaces (only one being shown at 132), a central opening 134, and an outer circumferential surface 136. The central opening 134 is defined by a surface 138, identical in shape to the corresponding surface of disc 53. Disc 130 is illustrated as partially broken away, showing the configuration of interior walls 140 which define a plurality of channels 142. Each channel 142 has a central inlet 144 and an outwardly disposed outlet 146. Vanes 148, generally like vanes 86 illustrated in FIGS. 7 through 9, are provided in each channel 142.

The disc 130 illustrated in FIG. 12 differs from the disc 53 illustrated in FIG. 7 with respect to channel configuration. In disc 53, channels 82 are generally arcuate and diverging, and comprise inlets and outlets which face away from the principal rotational direction of the disc. Channels 142 of disc 130 are also diverging (in the outward sense). However, channels 142 have inlets 144 which face toward the principal direction of disc rotation, shown at 150, and outlets 146 which are substantially transverse to the principal rotational direction. This can be seen in FIG. 12, wherein the walls 140 in the region of the channel inlets are shown to form an angle $\alpha$ (approximately 70°) with a tangent to an axial circle. The walls 140 at the outlets 146 form an angle $\beta$ (approximately 90°) with a tangent to an axial circle. This channel configuration is designed to maximize air flow and heat dissipation, especially in the region of the disc circumferential surfaces.

One further feature of the present invention should be discussed, and in this regard, reference is again directed to FIGS. 3 and 6. There, it can be seen that the innermost circular surface of wheel adaptor 66 is provided with a plurality of spaced radial projections 160. Recesses 162 space the projections 160. A sensor 164, an electromagnetic sensor for example, is fixed relative to housing 11, shown to be mounted on the mounting plate 46. Sensor 164 is held in place by coupling elements shown generally at 166, and delivers information to an external detector (not shown) via electrical leads 168. In operation, the sensor 164 senses the presence of each passing projection 160 and delivers a pulse to the external detector for each such sensing. The pulse rate is accordingly directly proportional to the rotational speed of the associated wheel. In use, this arrangement can be used as an anti-skid device to electronically ensure even braking of the respective vehicle wheels, and to ensure that one wheel does not lock while others are freely spinning.

Above, specific embodiments of the present invention have been described. It should be appreciated, however, that these embodiments were described for purposes of illustration only, without any intention of limiting the scope of the present invention. It is accordingly the intention that the present invention be limited not by the above, but only as is defined in the appended claims.

What is claimed is:

1. A disc brake assembly for a vehicle wheel, the assembly comprising, in combination: a brake housing defining an interior chamber; mounting means for securing said housing to a vehicle; an annular brake disc mounted within said housing, said disc having at least one planar braking surface; attachment means for associating said disc with a vehicle wheel for rotation therewith; at least one brake shoe means disposed within said housing on the planar braking surface side of said disc and mounted for axial movement toward and away from said disc; fluid controlled actuating means disposed within said housing for moving said brake shoe means toward said disc and in braking engagement therewith; fluid inlet means for delivering fluid to said actuating means, to selectively move said brake shoe means toward said disc; wherein each of said brake shoe means includes an annular backing plate, a brake lining secured to one surface of said backing plate for engagement with the adjacent planar braking surface of said disc, and guide means on the outer periphery of each said backing plate; and further comprising cooperating guide means on the inner surface of said housing for cooperating with the guide means on said backing plates and for guiding said backing plates toward and away from said disc without rotation relative to said housing.

2. A disc brake assembly in accordance with claim 1, wherein said housing comprises a pair of complementary housing members coaxial with an axle of the vehicle, each housing member having a central opening for accommodating said axle, an end wall, a circumferential surface and a mounting flange on said circumferential surface remote from said end wall; and further comprising means for connecting said housing members together.

3. A disc brake assembly in accordance with claim 1, wherein said disc has opposite planar side walls defining first and second planar braking surfaces, and inner and outer peripheral surfaces.

4. A disc brake assembly in accordance with claim 3, and further comprising a plurality of circumferentially spaced, generally radial channels between the side walls of said disc and extending from said inner to said outer peripheral surfaces of said disc.

5. A disc brake assembly in accordance with claim 4, and further comprising inlet port means through said housing for communicating ambient air with said channels at the inner peripheral surface of said disc; and outlet port means through said housing for communicating said channels with ambient air at the outer peripheral surface of said disc.

6. A disc brake assembly in accordance with claim 5, wherein said outlet port means is in the form of a plurality of spaced openings through the circumferential surface of at least one of said housing members.

7. A disc brake assembly in accordance with claim 6, wherein said outlet port means are asymmetrical with respect to the respective end walls of said housing members.

8. A disc brake assembly in accordance with claim 4, wherein said channels are arcuately shaped and extend in a direction opposite to the principal rotational sense of said disc.

9. A disc brake assembly in accordance with claim 1, wherein said actuating means comprises an annular bladder including first and second separate chambers therein, first nipple means for the introduction of fluid to said first chamber, and second nipple means for the introduction of fluid to said second chamber.

10. A disc brake assembly in accordance with claim 2, wherein said mounting means includes an annular plate having at least one opening therethrough, and means for securing said annular plate to one of said housing members; and wherein the central openings of the respective housing members are of diameters greater than said axle.

11. A disc brake assembly in accordance with claim 1, wherein said attachment means comprises an adaptor sleeve, first mounting means for securing one end of said adaptor sleeve to the vehicle wheel, and second mounting means for connecting the opposite end of said adaptor sleeve to said disc.

12. A disc brake assembly in accordance with claim 1, wherein said second mounting means comprises spline means on the outer periphery of said adaptor sleeve, and cooperating grooves on the inner peripheral wall of said disc for receiving said spline means, said spline means and said grooves cooperating so that said disc and said adaptor sleeve rotate together, but whereby said disc is permitted limited axial movement relative to said adaptor sleeve.

13. A disc brake assembly in accordance with claim 12, and further including a plurality of recesses between said disc and said adaptor sleeve for directing ambient air to said disc.

14. A disc brake assembly in accordance with claim 8, wherein each of said channels is provided with at least one inwardly directed vane extending between the inner and outer peripheral surfaces of said disc, said vanes being of arcuate shape corresponding to the arcuate configuration of said channels.

15. A disc brake assembly in accordance with claim 4, wherein said channels are S-shaped and extend at a first angle in a direction opposite to the principal rotational sense of said disc in the region of said inner peripheral surface, and extend substantially perpendicular to a tangent of said outer peripheral surface.

16. A disc brake assembly in accordance with claim 15, wherein said first angle is on the order of 70°.

17. A disc brake assembly in accordance with claim 15, wherein each of said channels is provided with at least one inwardly directed vane extending between the inner and outer peripheral surfaces of said disc, said vanes being of arcuate shape corresponding to the arcuate configuration of said channels.

18. A disc brake assembly in accordance with claim 9, wherein said first chamber receives hydraulic fluid and said second chamber receives compressed air.

19. A disc brake assembly in accordance with claim 1, and including first and second actuating means for controlling the operation of respective brake shoe means; first fluid inlet means on one side of said housing for supplying fluid to said first actuating means; and second fluid inlet means entering the same side of said housing, extending through internal passages carved through said housing, and communicating with said second actuating means from the opposite side of said housing.

20. A disc brake assembly for a vehicle wheel, the assembly comprising, in combination: a brake housing defining an interior chamber; mounting means for securing said housing to a vehicle; an annular braking disc mounted within said housing, said braking disc having at least one planar side wall; attachment means for associating said braking disc with the wheel of said vehicle for rotation therewith; at least one brake shoe means disposed within said housing, mounted for axial movement toward and away from said braking disc, and adapted to contact said at least one planar side wall; bladder means for setting the initial clearance between said braking disc and said brake shoe means and for effecting a braking action, said bladder means having a first chamber for receiving a first fluid and for setting said initial clearance, and having a second chamber for receiving a second fluid and for urging said brake shoe means toward said braking disc to effect a braking action; first fluid inlet means for introducing said first fluid to said first chamber until said initial clearance is set; and second fluid inlet means for introducing said second fluid to said second chamber, said second fluid inlet means being actuated each time a braking action is desired, and said second fluid being released from said second chamber when no braking action is desired.

21. A disc brake assembly for a vehicle wheel, the assembly comprising, in combination: a brake housing defining an interior chamber; mounting means for securing said housing to a vehicle; an annular brake disc mounted within said housing, said disc having a central opening and being defined by opposite planar side walls and inner and outer peripheral surfaces; attachment means for associating said disc with a vehicle wheel for rotation therewith; first and second brake shoe means disposed within said housing on respective sides of said disc and mounted for axial movement toward and away from said disc; and actuating means disposed within said housing for moving said brake shoe means toward said disc and in braking engagement therewith; said attachment means having a first end for mounting on a vehicle wheel, and having a second end for coupling said disc to said vehicle wheel so that said disc and wheel are integral in a rotational sense, but so that said disc is permitted a limited degree of axial movement between said first and second brake shoe means; said second end of said attachment means being dimensioned such as to be received by the central opening of said disc, to rotationally lock relative to said disc, and to axially slide relative to said disc so that said attachment means can be removed from said housing and hence from said disc upon the wheel being removed.

22. A disc brake assembly for a vehicle wheel, the assembly comprising, in combination: a brake housing defining an interior chamber; mounting means for securing said housing to a vehicle; an annular brake disc mounted within said housing, said disc being defined by opposite planar side walls and inner and outer peripheral surfaces; attachment means for associating said disc with a vehicle wheel for rotation therewith; a plurality of circumferentially spaced, generally radial channels between the side walls of said disc and extending from said inner to said outer peripheral surfaces thereof; first and second brake shoe means disposed within said housing on respective sides of said disc and mounted for axial movement toward and away from said disc; fluid controlled actuating means disposed within said housing for moving said brake shoe means toward said disc and in braking engagement therewith; fluid inlet means for delivering fluid to said actuating means, to selectively move said brake shoe means toward said disc; inlet port means through said housing for communicating ambient air with said channels at the inner peripheral surface of said disc; outlet port means through said housing for communicating said channels with ambient air at the outer peripheral surface of said disc; wherein said channels are S-shaped and extend at a first angle in a direction opposite to the principal rotational sense of said disc in the region of said inner peripheral surface, and extend substantially perpendicular to a tangent of said outer peripheral surface; and wherein said first angle is on the order of 70°.

23. A disc brake assembly in accordance with claim 20, wherein said housing comprises a pair of complementary housing members coaxial with an axle of the vehicle, each housing member having a central opening for accommodating said axle, an end wall, a circumferential surface and a mounting flange on said circumferential surface remote from said end wall; and further comprising means for connecting said housing members together.

24. A disc brake assembly in accordance with claim 20, wherein each of said brake shoe means includes an annular backing plate, a brake lining secured to one surface of said backing plate for engagement with the adjacent surface of said disc, and guide means on the outer periphery of each said backing plate; and further comprising cooperating guide means on the inner surface of said housing for cooperating with the guide means on said backing plate and for guiding said backing plates toward and away from said disc.

25. A disc brake assembly in accordance with claim 23, wherein said mounting means includes an annular plate having at least one opening therethrough, and means for securing said annular plate to one of said housing members; and wherein the central openings of the respective housing members are of diameters greater than said axle.

26. A disc brake assembly in accordance with claim 20, wherein said attachment means comprises an adaptor sleeve, first mounting means for securing one end of said adaptor sleeve to the vehicle wheel, and second mounting means for connecting the opposite end of said adaptor sleeve to said disc.

27. A disc brake assembly in accordance with claim 26, wherein said second mounting means comprises spline means on the outer periphery of said adaptor sleeve, and cooperating grooves on the inner peripheral wall of said disc for receiving said spline means, said spline means and said grooves cooperating so that said disc and said adaptor sleeve rotate together, but whereby said disc is permitted limited axial movement relative to said adaptor sleeve.

28. A disc brake assembly in accordance with claim 20, wherein said first fluid is a hydraulic fluid and said second fluid is compressed air.

29. A disc brake assembly in accordance with claim 20, and including first and second actuating means for controlling the operation of respective brake shoe means; first fluid inlet means on one side of said housing for supplying fluid to said first actuating means; and second fluid inlet means entering the same side of said housing, extending through internal passages carved through said housing, and communicating with said second actuating means from the opposite side of said housing.

30. A disc brake assembly in accordance with claim 20, wherein said housing comprises a pair of complementary housing members coaxial with an axle of the vehicle, each housing member having a central opening for accommodating said axle, an end wall, a circumferential surface and a mounting flange on said circumferential surface remote from said end wall; and further comprising means for connecting said housing members together.

31. A disc brake assembly in accordance with claim 21, wherein each of said brake shoe means includes an annular backing plate, a brake lining secured to one surface of said backing plate for engagement with the adjacent surface of said disc, and guide means on the outer periphery of each said backing plate; and further comprising cooperating guide means on the inner surface of said housing for cooperating with the guide means on said backing plates and for guiding said backing plates toward and away from said disc.

32. A disc brake assembly in accordance with claim 21, wherein said actuating means comprises an annular bladder including first and second separate chambers therein, first nipple means for the introduction of fluid to said first chamber, and second nipple means for the introduction of fluid to said second chamber.

33. A disc brake assembly in accordance with claim 30, wherein said mounting means includes an annular plate having at least one opening therethrough, and means for securing said annular plate to one of said housing members; and wherein the central openings of the respective housing members are of diameters greater than said axle.

34. A disc brake assembly in accordance with claim 21, wherein said second end of said attachment means comprises spline means on the outer periphery thereof, and further comprising cooperating said spline means.

35. A disc brake assembly in accordance with claim 34, and further including a plurality of recesses between said disc and said second end of said attachment means for directing ambient air to said disc.

36. A disc brake assembly in accordance with claim 21, wherein each of said brake shoe means includes an annular backing plate, a brake lining secured to one surface of said backing plate for engagement with the adjacent surface of said disc, and guide means on the outer periphery of each said backing plate; and further comprising cooperating guide means on the inner surface of said housing for cooperating with the guide means on said backing plates and for guiding said backing plates toward and away from said disc.

* * * * *